US012676879B2

(12) United States Patent
Ankaiah et al.

(10) Patent No.: US 12,676,879 B2
(45) Date of Patent: Jul. 7, 2026

(54) SECURE PORT FORWARDING

(71) Applicant: Cambium Networks Ltd, Ashburton (GB)

(72) Inventors: Shashi Hosakere Ankaiah, Bangalore (IN); Trevor Miranda, San Franscisco, CA (US); Vijay Yadav, Bangalore (IN); Vivek Lakshminarayana Atreya, Bangalore (IN)

(73) Assignee: Cambium Networks Ltd, Ashburton (GB)

( * ) Notice: Subject to any disclaimer, the term of this patent is extended or adjusted under 35 U.S.C. 154(b) by 110 days.

(21) Appl. No.: 18/526,725

(22) Filed: Dec. 1, 2023

(65) Prior Publication Data

US 2024/0414186 A1 Dec. 12, 2024

(30) Foreign Application Priority Data

Jun. 8, 2023 (IN) .............................. 202341039377

(51) Int. Cl.
*H04L 9/40* (2022.01)

(52) U.S. Cl.
CPC ........ *H04L 63/1433* (2013.01); *H04L 63/107* (2013.01); *H04L 63/1416* (2013.01); *H04L 63/1425* (2013.01)

(58) Field of Classification Search
CPC ............... H04L 63/1433; H04L 63/107; H04L 63/1416; H04L 63/1425
See application file for complete search history.

(56) References Cited

U.S. PATENT DOCUMENTS

| | | | | |
|---|---|---|---|---|
| 9,306,962 B1 * | 4/2016 | Pinto | ................... | H04L 63/1416 |
| 10,819,723 B2 * | 10/2020 | Kuperman | .......... | H04L 12/2803 |
| 11,777,992 B1 * | 10/2023 | Cross | .................. | H04L 63/0876 |
| | | | | 726/5 |
| 2003/0154269 A1 * | 8/2003 | Nyanchama | ........ | H04L 63/1433 |
| | | | | 709/223 |
| 2009/0077666 A1 * | 3/2009 | Chen | .................. | G06Q 10/0631 |
| | | | | 726/25 |
| 2012/0144494 A1 * | 6/2012 | Cole | .................. | G02B 6/12023 |
| | | | | 726/25 |
| 2013/0191919 A1 * | 7/2013 | Basavapatna | ........... | H04L 63/20 |
| | | | | 726/25 |
| 2014/0137257 A1 * | 5/2014 | Martinez | ............. | H04L 63/1433 |
| | | | | 726/25 |
| 2018/0020015 A1 * | 1/2018 | Munro | .................. | G06F 21/552 |
| 2018/0084000 A1 * | 3/2018 | Baukes | .............. | H04L 61/4511 |
| 2018/0205749 A1 * | 7/2018 | Nandha Premnath | ...................... | |
| | | | | H04W 12/122 |
| 2018/0278637 A1 * | 9/2018 | Kuperman | .......... | H04L 63/0884 |

(Continued)

*Primary Examiner* — Khalid M Almaghayreh
(74) *Attorney, Agent, or Firm* — Crowell & Moring LLP

(57) ABSTRACT

A network edge device configured to perform a method for controlling access to services in a network, the network including at least one device configured to provide a service, the service being associated with a port is provided. The method involves performing a port identification scan on the network to generate port data representing the service and the port; obtaining port vulnerability data; generating a port vulnerability score for the port based on the port data and the port vulnerability data; obtaining a threshold port vulnerability score; and controlling access to the port in dependence on a comparison of the port vulnerability score with the threshold port vulnerability score.

16 Claims, 7 Drawing Sheets

(56)                    References Cited

U.S. PATENT DOCUMENTS

| | | | |
|---|---|---|---|
| 2019/0227758 A1* | 7/2019 | Suzuki | H04N 1/0001 |
| 2019/0258525 A1* | 8/2019 | Glenn | H04L 63/20 |
| 2019/0258804 A1* | 8/2019 | Glenn | H04L 63/1433 |
| 2020/0322363 A1* | 10/2020 | Huang | H04L 67/141 |
| 2020/0389480 A1* | 12/2020 | Nunes | G06F 21/57 |
| 2021/0314345 A1* | 10/2021 | Glenn | G06F 9/5077 |
| 2021/0314346 A1* | 10/2021 | Glenn | H04L 63/1425 |
| 2022/0103592 A1* | 3/2022 | Semel | H04L 63/1408 |
| 2023/0319078 A1* | 10/2023 | Fite | H04L 63/1466 |
| | | | 726/23 |

* cited by examiner

100

102

Processor(s)

106

Storage          104

Instructions          108

Port Data          110

Port
Vulnerability
Data          112

Port
Vulnerability
Score          114

Threshold
Port
Vulnerability
Score          116

118

Communication
Module(s)

200

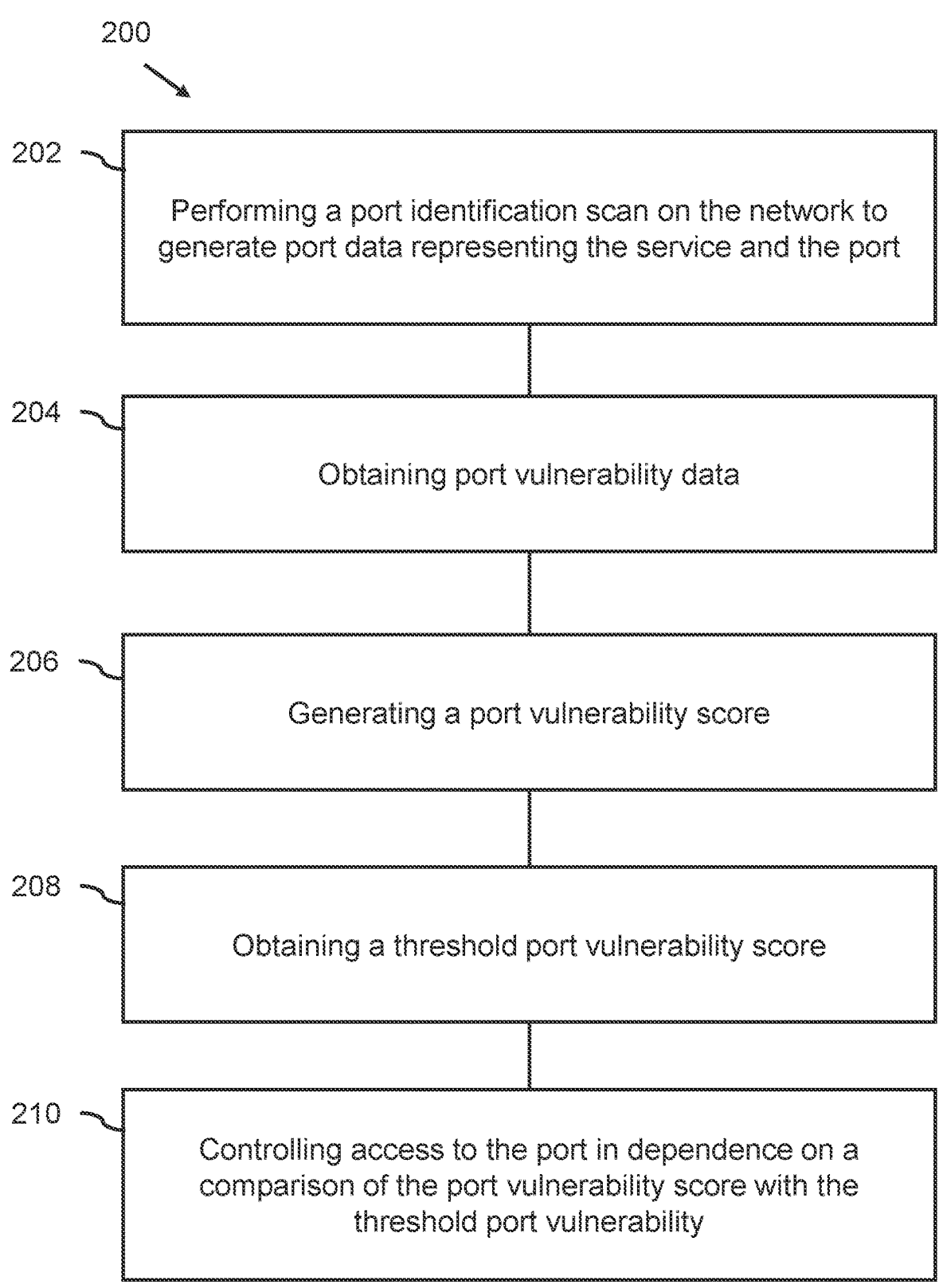

202 — Performing a port identification scan on the network to generate port data representing the service and the port 204 — Obtaining port vulnerability data 206 — Generating a port vulnerability score 208 — Obtaining a threshold port vulnerability score 210 — Controlling access to the port in dependence on a comparison of the port vulnerability score with the threshold port vulnerability

*FIG. 2*

| Port Data | | | Port Vulnerability Score |
|---|---|---|---|
| Device ID/IP Address | Port No. | Service | |
| A (302) | 80 | - Internet Printing Protocol | 40 |
| B (310) | 20, 80 | - File Transfer | 20, 40 |
| C (312) | 20, 80, 137, 138 | - File Transfer<br>- Backup Protocols | 20, 40, 50 |

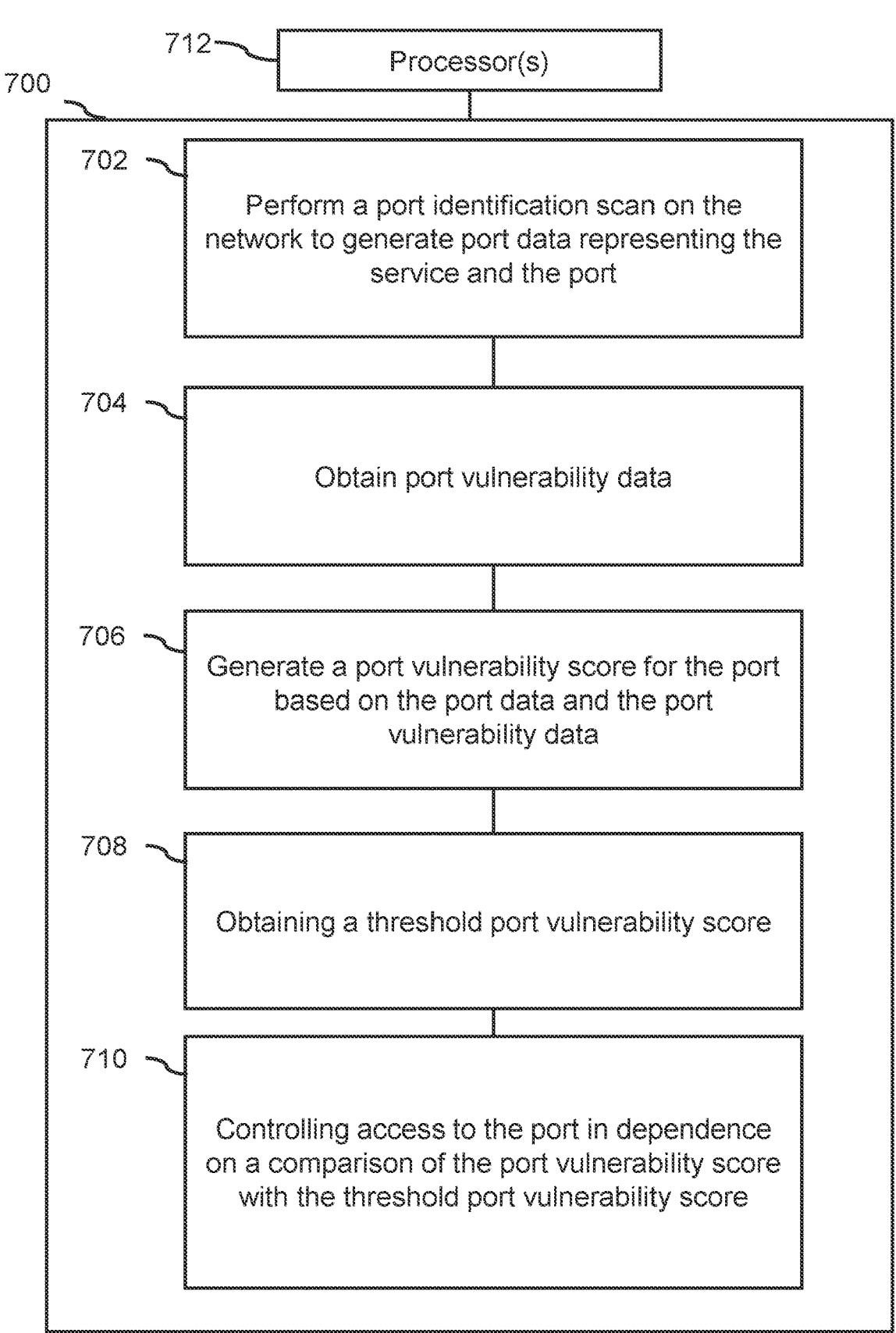

712 — Processor(s)

700

702 — Perform a port identification scan on the network to generate port data representing the service and the port 704 — Obtain port vulnerability data 706 — Generate a port vulnerability score for the port based on the port data and the port vulnerability data 708 — Obtaining a threshold port vulnerability score 710 — Controlling access to the port in dependence on a comparison of the port vulnerability score with the threshold port vulnerability score

*FIG. 7*

SECURE PORT FORWARDING

CROSS-REFERENCE TO RELATED APPLICATION

This application claims priority to India patent application No. 202341039377, filed on Jun. 8, 2023, the entirety of which is hereby fully incorporated by reference herein.

BACKGROUND

Field of the Invention

This present disclosure relates to port forwarding in network computing. More specifically but not exclusively the present disclosure relates to increased security in port forwarding.

Description of the Related Technology

Port forwarding is a technique used in computer networking to redirect incoming network traffic from one IP address and port number combination to another. It allows external devices or networks to access services or applications running on a private network or a specific device within the network.

Port forwarding enables the setting of rules in a router or firewall that specify how incoming data packets should be routed to a particular device or service within a local network. By doing so, it becomes possible to make a specific application or service accessible from the internet, even though it resides behind a router or firewall. For example, services like web servers, file-sharing applications, game servers, or remote access applications running on a local network can be made accessible to the outside world over wide area networks, such as the internet.

When setting up port forwarding in a network, it is important to consider security implications. Opening ports and exposing services to the internet can potentially increase the risk of unauthorized access or attacks.

SUMMARY

In accordance with a first aspect of the present disclosure there is provided a computer-implemented method for controlling access to services in a network using a network edge device, the network including at least one device configured to provide a service, the service being associated with a port, the computer-implemented method including: performing a port identification scan on the network to generate port data representing the service and the port; obtaining port vulnerability data; generating a port vulnerability score for the port based on the port data and the port vulnerability data; obtaining a threshold port vulnerability score; and controlling access to the port in dependence on a comparison of the port vulnerability score with the threshold port vulnerability score.

By controlling access to ports in dependence on a comparison of a port vulnerability score with a threshold port vulnerability score, it becomes possible to more consistently and predictably protect network devices, that are providing services in the network, from malicious attacks. It is desirable to identify potential vulnerabilities in a network, and to control access to ports to mitigate said vulnerabilities, without unduly burdening network administrators and the devices providing said services Obtaining port vulnerability data may include accessing a vulnerabilities and exposures database.

Vulnerabilities and exposures databases provide centralized and accurate data sources for identifying contemporaneous information regarding port forwarding vulnerabilities. Accessing these databases allows the network edge device to efficiently and readily obtain vulnerability data to assess potential vulnerabilities in the ports on the network.

Obtaining port vulnerability data may include performing a port security scan to generate port security data representing a strength of security features associated with the port, the security features including at least one: passwords; hashes; and ciphers.

Evaluating the security features used by the devices in the network allows the network edge device to identify vulnerabilities that are specific to the devices in the network and/or to compare those features and their respective strengths with the known vulnerabilities from the vulnerabilities and exposures database. This enables the system to identify whether the security practices in the network coincide with known port and/or service vulnerabilities.

Obtaining port vulnerability data may include accessing historical intrusion data identifying historical malicious network penetration attempts.

Historical intrusion data may be used to identify vulnerabilities that are specific to the potential malicious attacks having already been attempted, and enables the network edge device to take actions to mitigate the risk of these same attacks occurring in the future.

Generating a port vulnerability score for the port may include: obtaining an initial vulnerability score from a vulnerabilities and exposures database; and modifying the initial vulnerability score based on one or more characteristics associated with the port.

Port vulnerability scores obtained from a vulnerabilities and exposures database, such as a common exposures and vulnerabilities, offer promising starting points for generating vulnerability scores. By modifying the initial score, it is possible to obtain a more accurate vulnerability score that enables increased precision when control access to service via port forwarding.

Controlling access to the port may include preventing access to the port when it is determined that the port is vulnerable based on the comparison of the port vulnerability score with the threshold port vulnerability score.

Preventing access to the port in this manner protects the device operating the port in the event that the security risks exceed a desired risk level, as may be determined by a network administrator or tuned according to network traffic.

Controlling access to the port may include restricting access to the port based on at least one of: Internet Protocol (IP) addresses; a set of subnets; and a geographic location of a device attempting to access the service.

Controlling access to the port in this manner provides more granular control to the port thereby enabling the port to operate in some specific cases while mitigating particularly high-risk behaviors.

At least one of the port identification scan and generating the port vulnerability score is performed repeatedly.

By repeatedly performing the scan and/or calculating the vulnerability score the network edge device may respond to changes in the network traffic, services provided by devices in the network, newly identified vulnerabilities, and vulnerability patches such that security performance of the method is maintained.

The port identification scan and/or generating the port vulnerability score may be performed repeatedly based on at least one of: a periodic interval; a change to the network; and a malicious network penetration attempt.

By performing the scans and/or vulnerability generation in response to certain triggers, as described above, a desired performance can be achieved in security provisions without introducing an undue burden on the network edge device.

In accordance with a second aspect of the present disclosure there is provided a network edge device for controlling access to services provided by a device attached to a network, the network edge device comprising a processor and storage, the storage comprising computer-executable instructions which, when executed by the processor, cause the network edge device to: perform a port identification scan on the network to generate port data representing the service and the port; obtain port vulnerability data; generate a port vulnerability score for the port based on the port data and the port vulnerability data; obtain a threshold port vulnerability score; and control access to the port in dependence on a comparison of the port vulnerability score with the threshold port vulnerability score.

In accordance with a third aspect of the present disclosure there is provided a non-transitory computer-readable storage medium comprising computer-executable instructions which, when executed by at least one processor, cause the processor to: perform a port identification scan on the network to generate port data representing the service and the port; obtain port vulnerability data; generate a port vulnerability score for the port based on the port data and the port vulnerability data; obtain a threshold port vulnerability score; and control access to the port in dependence on a comparison of the port vulnerability score with the threshold port vulnerability score.

BRIEF DESCRIPTION OF THE DRAWINGS

In order that the present invention may be more readily understood, examples of the invention will now be described, with reference to the accompanying drawings, in which:

FIG. 2 is a flow chart showing an example of a method according to examples;

FIG. 7 is a schematic diagram showing a non-transitory computer-readable storage medium according to examples.

DETAILED DESCRIPTION

Figure 1:
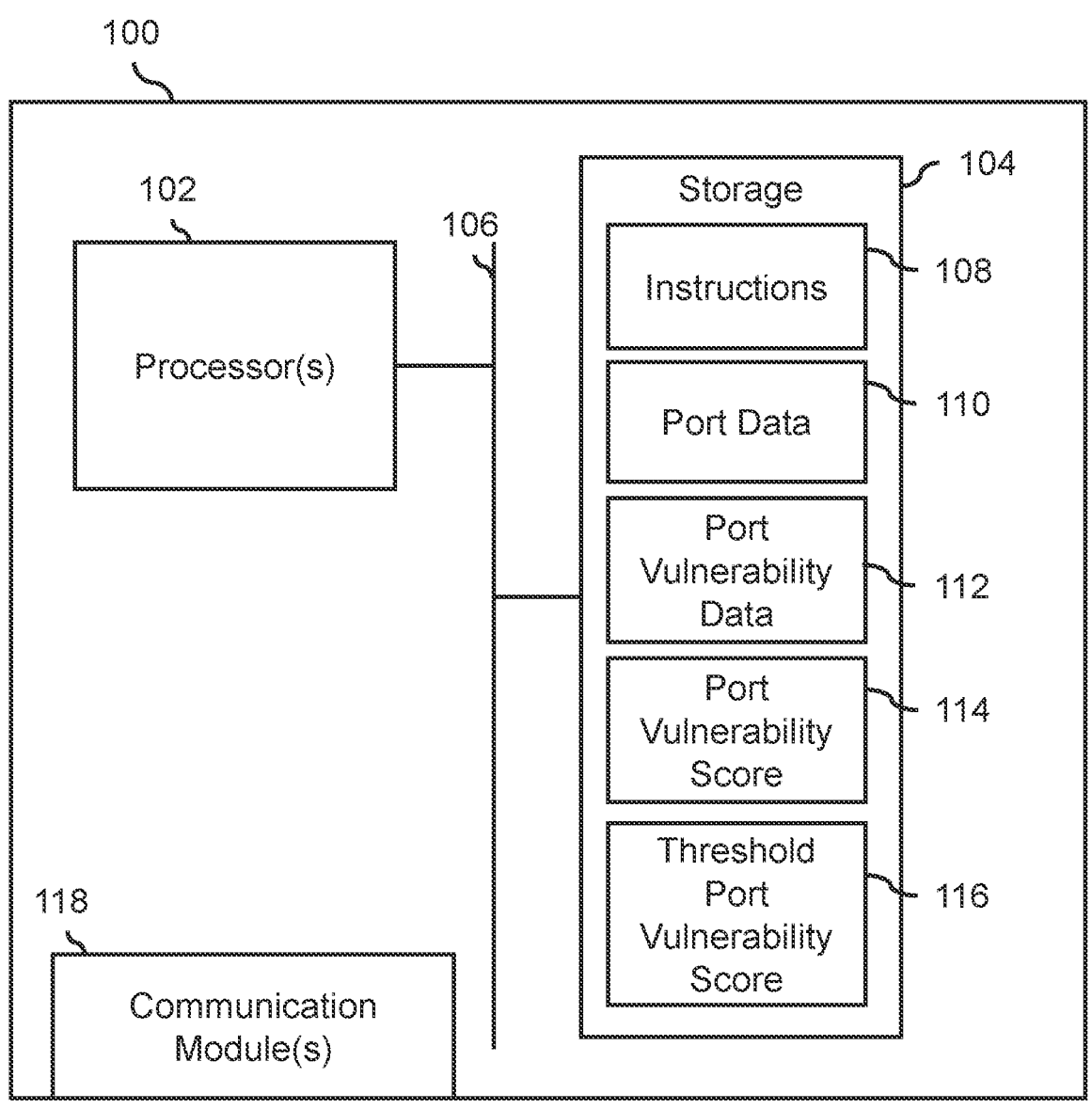
FIG. 1 is schematic diagram showing an example of network edge device according to examples.

Computer networks are fundamental to modern computing infrastructure and are widely used in businesses, schools, and homes. Networks can be configured in a variety of ways, some of which require greater computational and administrative burden than others. Port forwarding is a method used in computer networking to allow external devices to access services on private networks. It works by redirecting communication requests from one address (e.g., an IP address) and port number to another address and port number. Port forwarding is typically implemented as a form of network address translation (NAT) that can be implemented in a network edge device that connects a private network to a public network.

An example process of port forwarding may occur as follows:

a. A private network is provided, that includes devices such as computers, servers, or IoT devices. The private network includes a router or other network edge device that connects the private network to the internet.

b. An application or service running on one of the devices within the private network listens for incoming connections on a specific port (e.g., Port 80 for HTTP).

c. The router or network edge device is configured to forward any incoming traffic on Port 80, destined for the device running the application, to the internal IP address of the device running the application/service on Port 80.

d. When an external device or network tries to access the application/service, it sends a request to a public IP address (assigned by your ISP) on Port 80.

e. The router or network edge device receives the request and forwards the incoming traffic to the appropriate device based on the port forwarding configuration that has been set up.

f. The application or service on the designated device processes the incoming request and sends a response back through the router/network edge device to the external device.

It is important when implementing a port forwarding service in a network to consider security implications. Opening ports and exposing services to the internet can increase the risk of unauthorized access or attacks. There are a number of security best practices that should be followed including, using strong passwords, regularly updating software, and considering additional security measures like firewalls and intrusion detection systems to safeguard the local network.

Certain examples described herein provide methods and network devices which are designed to address these security risks by evaluating the vulnerabilities and security risks associated with given ports and devices in the network and applying control policies that aim to mitigate these risks in a manner that does not place an undue burden on network administration or throttling of service provision. A measure of the risks associated with a given port and service is determined for a device and compared against a threshold to determine whether a restriction in port forwarding should be applied. In some cases, the restricting port of forwarding may involve applying granular control policies that can mitigate the risks of malicious attacks, while allowing the service to continue to be provided to within the private network or to other specific devices which are more secure or less likely to be malicious.

It is to be appreciated that the features and concepts described herein with respect to port forwarding are also applicable to techniques such as one-to-one network address translation (one-to-one NAT), and one-to-many network address translation (one-to-many NAT). One-to-one NAT, also known as static NAT, or one-to-one mapping, involves mapping one internal IP address to one external IP address. It is typically used when an organization has more devices than available public IP addresses. One-to-one NAT allows all ports and protocols to be forwarded from the external IP address to the corresponding internal IP address. This means that all inbound and outbound traffic is translated to and from the specific device with the assigned internal IP address. One-to-one NAT is often used for scenarios like hosting multiple servers behind a single public IP address, where each server requires its own public IP.

One-to-many NAT also known as dynamic NAT or port address translation (PAT), involves mapping multiple internal IP addresses to a single external IP address. It is typically used when there are more devices in a local network than available public IP addresses. With one-to-many NAT, the router or firewall assigns a unique port number to each internal IP address, allowing multiple devices to share a single public IP address. This means that multiple devices can access the internet using a single external IP, and the router, or network edge device, keeps track of the translations by maintaining a mapping table. One-to-many NAT allows for many devices to have internet connectivity while conserving public IP addresses.

FIG. 1 shows an example of a network edge device 100 configured to connect a local, or private, network with external networks, such as the internet. The network edge device 100 comprises one or more processors 102, and storage 104 connected over a communications channel 106, such as a bus. The storage 104 is suitable for storing a set of computer-executable instructions 108 for executing a method 200, which will be described further below with respect to FIGS. 2 to 6. The storage 104 may also be suitable for storing other types of data such as port data 110, port vulnerability data 112, port vulnerability scores 114, and threshold port vulnerability scores 116. The storage 104 may include any combination of volatile and non-volatile storage, for example, a combination of read-only memory (ROM) and one or more types of random-access memory (RAM), such as dynamic RAM, synchronous RAM, and so forth. ROM may be included in the form of both disc-based (e.g., hard drive) or flash memory (e.g., solid state drive(s)). The processor(s) 102 may include any suitable combination of processing circuitry configured to execute the instructions 108. The processor(s) 102 may include one or more general purpose processors, such as central processing units (CPU), and/or application specific processing circuitry or processing units. The network edge device 100 may additionally include one or more communications modules 118 configured to enable communication with one or more further computing devices, for example, as part of a network. The communications module(s) 118 may comprise wireless and/or wired communications modules to enable at least one of wired LAN and wireless LAN connectivity. These communications modules 118 may implement known protocols and standards such as WI-FIR, BLUETOOTH®, Ethernet, and so forth. The network edge device 100 may be capable of communicating over both local and wide area networks via the communications module(s) 118.

Figure 3:
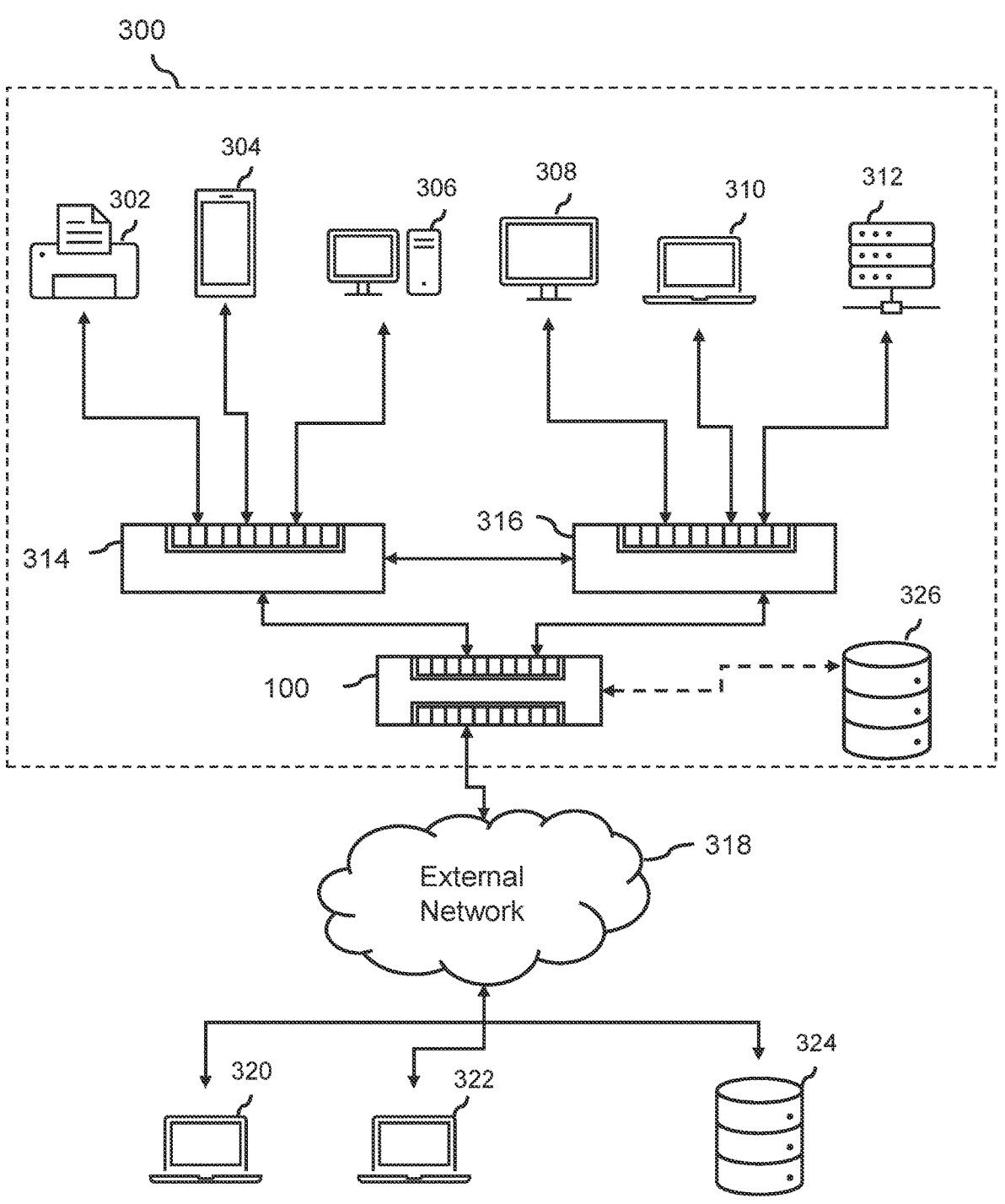
FIG. 3 is a schematic diagram showing an example of a network in which a network edge deice is provided according to examples.

Turning briefly to FIG. 3, an example of a network 300 in which a network edge device 100 is provided is shown. The network 300 may be a local network, or a private network, such as may be found in a home or office environment to enable network computing functions such as file transfer, printing, and so forth. The network edge device 100 enables communication between a number of devices in the network 300 and external networks 318 such as the internet. The network 300 includes network devices 314 and 316 which act as access points and/or switches for enabling communication between computing devices 302 to 312. These computing devices may also be referred to as user devices, or simply devices, though it will be appreciated that these devices may not be associated with specific users. A distinction is drawn between the network devices 314 and 416 which operate to enable communication in the network 300, and the user devices 302 to 312 which utilize the network capabilities to communicate amongst each other.

In the example shown in FIG. 3, a plurality of device types is shown including a printer 302, a smartphone 304, a laptop computer 310, a desktop computer 306, a smart television 308, and a server computer 312. The devices 302 to 312 shown in FIG. 3 and connected in the network 300 are provided as examples only and it is to be appreciated that a variety of communications enables computing devices, not shown, may additionally, or alternatively, be connected to the network 300.

The network devices 314 and 316 are communicatively coupled to allow communications between the devices 302 to 306 connected to the first network device 314 and the devices 308 to 312 connected to the second network device 316. The network devices 314 and 316 may implement a number of network functions for managing devices 302 to 312 including authentication, bandwidth distribution, message forwarding, and switching. The network device 314 and 316 may be the same type of network devices such as wireless access points, though in some cases, the network devices 314 and 316 may be different examples of network devices which include different functionality.

The network edge device 100 provides a gateway for devices 302 to 312 in the network 300 to communicate with further devices 320 to 322 via one or more external networks 318 such as the internet. The network edge device 100 may be configured to perform port forwarding, as described above, in which communications from the further devices 320 to 322 addressed to public IP addresses and specific ports, are processed and forwarded to the relevant devices 302 to 312 using their private IP address in the network 300. The network edge device 100 may typically be responsible for further network management operations such as authentication, traffic monitoring, network address translation, security, and so forth.

The network edge device 100 may also communicate with one or more services via the external network. For example, a common vulnerabilities and exposures database 324 service is shown in FIG. 3. The network edge device 100 may be capable of accessing this vulnerabilities and exposure database 324, as will be described further below.

As discussed above, the storage 104 includes instructions 108 for performing a method 200, shown in the flow chart of FIG. 2, for controlling access to services in the network 300 the network 300 including at least one device 302 configured to provide a service. The service provided by the device 302 is associated with a port. The service provided may include access to one or more applications and/or specific functions provided within applications running on the device 302. In the case of the device 302 shown, the service may be an internet printing protocol service running on port 80. The method 200 will now be described with respect to FIGS. 2 to 6. The method 200 involves performing 202 a port identification scan on the network 300 to generate port data 110 representing the service and the port, obtaining 204 port vulnerability data 112, and then generating 206 a port vulnerability score 114 based on the port data 110 and the port vulnerability data 112. A threshold port vulnerability score 116 is obtained 208, and access to the port is controlled 210 in dependence on a comparison of the port vulnerability score 114 with the threshold port vulnerability score 116.

By controlling 210 access to the port based on this comparison it becomes possible to automatically and quickly identify ports for which the risk associated with operating the port exceeds a predetermined acceptability threshold and take action to mitigate those risks. Using a threshold port vulnerability score 116 enables consistent rules to be applied across all devices in the network. Typically, the risks associated with different ports and services are also different and applying a consistent and dependable security practice across the network 300 presents a challenge. Generating a port vulnerability score provides a method for standardizing approaches to port forwarding security in networks 300 and allows administrators to ensure that security policies are being applied consistently, quickly, and across a variety of port and service types.

Figure 4:
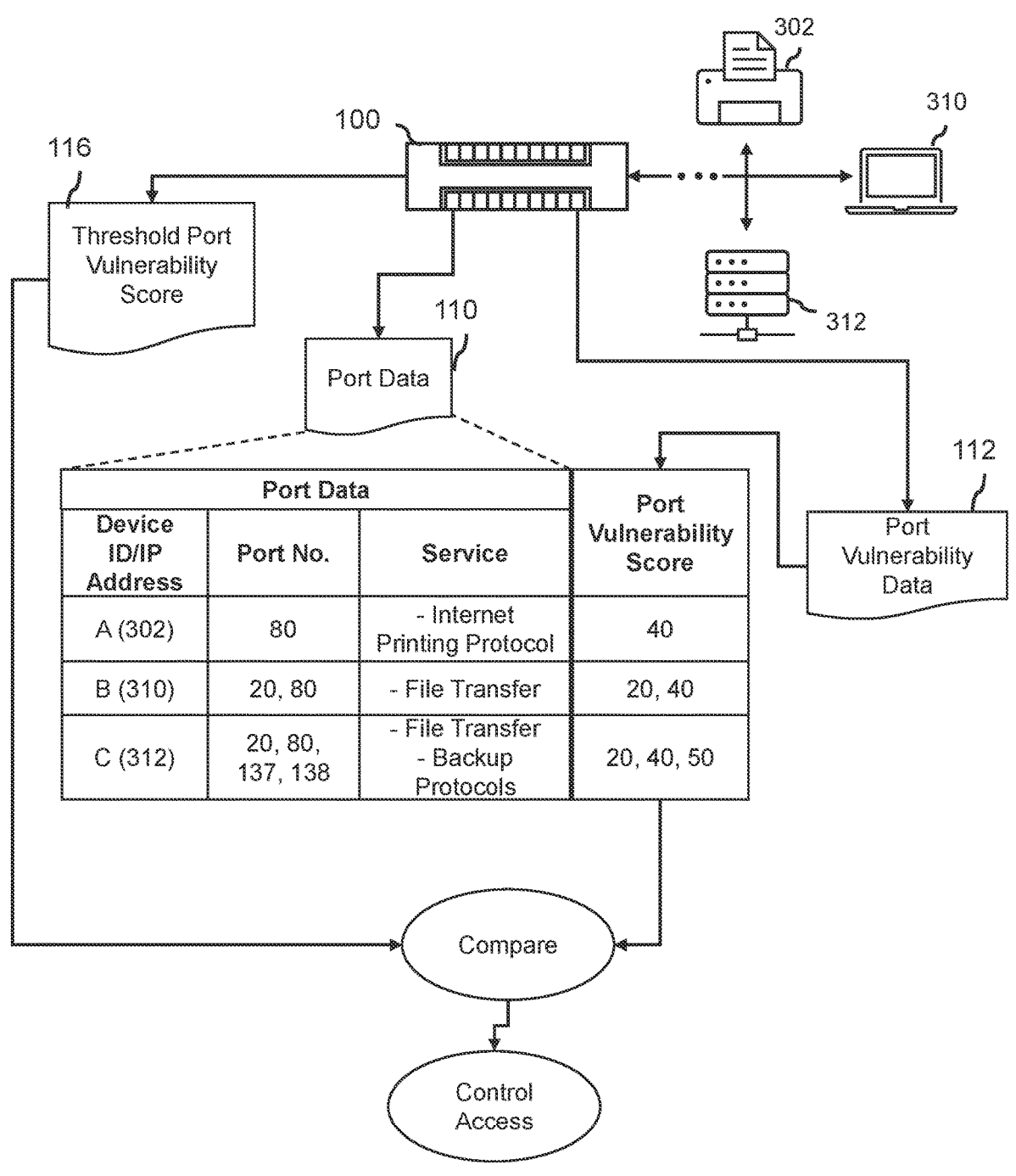
FIG. 4 is a schematic diagram shows an example of port data according to examples.
Figure 5:
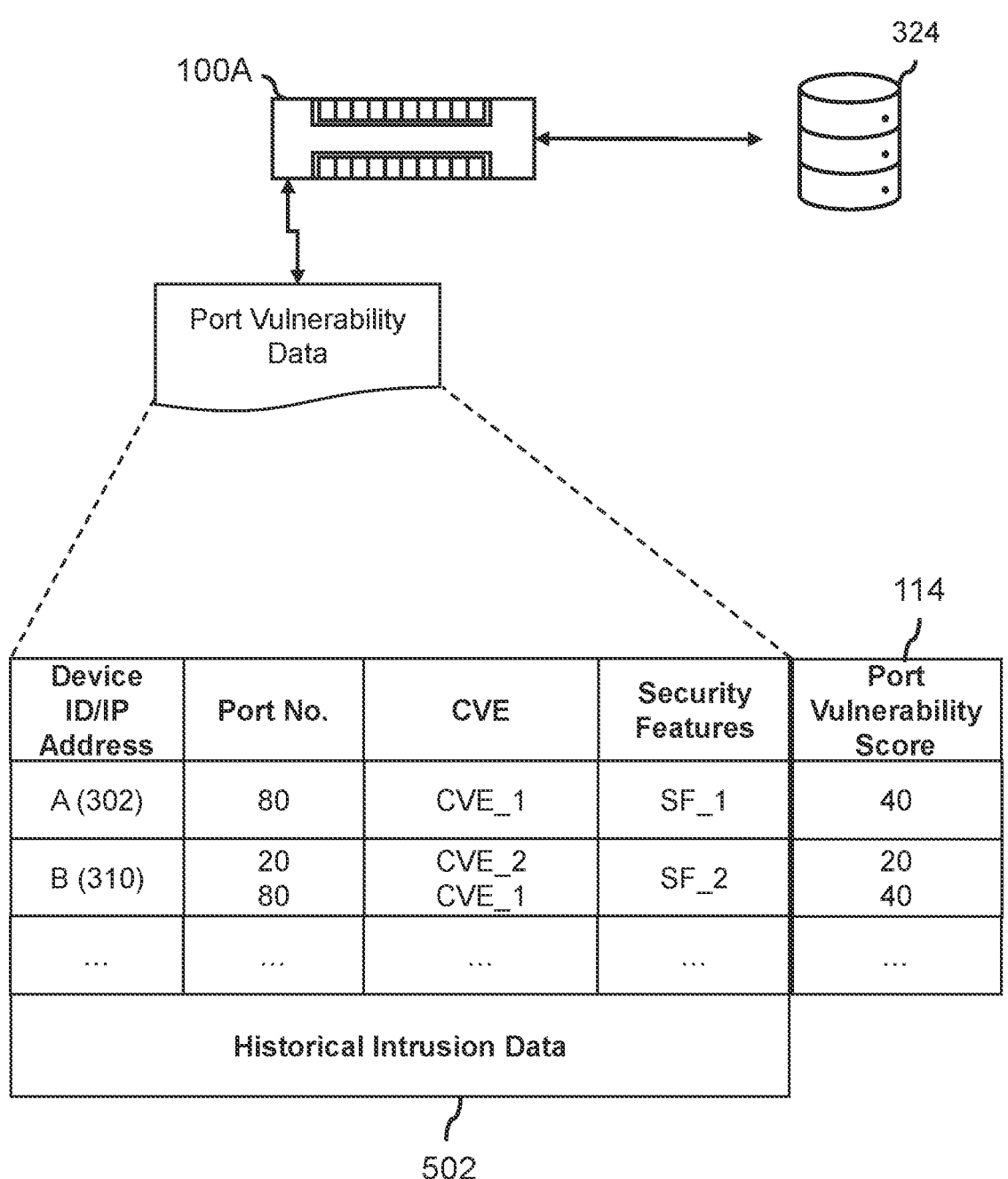
FIG. 5 is a schematic diagram showing an example of port vulnerability data according to examples.

Turning to FIG. 4, an example of the port data 110 is shown. The port data 110 includes details identifying the devices 302, 310, and 312 in the network 300 that provide services. In the example shown in FIG. 4, the port data 110 includes a device identifier, which may be a unique identification number and/or an IP address for the device 302, 310, and 312, such as a private IP address for use within the network 300. The port data 110 additionally associates the device identifier with a port number on which the respective device is offering a service and/or an indication of the associated service. For example, device 302 is represented in the port data 110 using a device ID "A". The device 302 is operating on port 80 and offering internet printing services.

Other examples of devices, port numbers, and their associated services are also shown in FIG. 4. While a limited number of examples are shown in FIG. 4, it is to be appreciated that any service that may be provided by a computing device 302 to 312 to other computing devices may be associated with one or more respective ports. In some cases, the provision of a particular service may require the use of more than one port, for example where multiple data streams are needed to operate the said service. In some circumstances a port may be exclusively associated with a given service, however, it is to be appreciated that some ports may be used for a plurality of different service types, though typically not at the same time.

A port identification scan involves communicating with the devices 302 to 312 in the network 300 to determine which ports are currently active and which services are being offered to other computing devices. The port identification scan may be performed repeatedly, for example at regular intervals, and/or according to a predetermined frequency or period. For example, a port identification scan may be performed at specific times and/or at specific intervals relative to one or more triggering events.

The state of active ports may change in the network 300 based on workloads, service policies, and/or user operation of the computing device 302 to 312 in the network 300. Performing a port identification scan regularly may ensure that the port data 110 is kept up-to-date with the latest changes in the active ports being used by the devices 302 and 312. Additionally, or alternatively, the port identification scan may be performed in response to triggering events such as changes in the network, a change in network traffic, network traffic exceeding or falling below a predetermined network traffic threshold, detected network events (e.g., the addition or removal of devices in the network 300), malicious network penetration attempts, and so forth. In this way, the network edge device 100 may react to events that are more likely to alter the state of ports and/or security risks, in the network 300 and hence may reduce the overall amount of time spent on Turning briefly to FIG. 5, an example of port vulnerability data 112 is shown. The port vulnerability data 112 includes data representing vulnerabilities associated with the port. In the example shown, the port vulnerability data 112 includes an entry for the devices 302 and 310 having an open port. Port vulnerabilities in port forwarding generally refer to security weaknesses or risks associated with the process of port forwarding. While port forwarding itself is not inherently vulnerable, misconfigurations or insecure practices in port forwarding can expose private networks and devices to various risks. Examples of port vulnerabilities related to port forwarding include: service vulnerabilities, weak authentication, which is to say authentication that falls below a predetermined standard, excessive open ports, misconfiguration, and more. Service vulnerabilities involve circumstances in which an application or service running on the device behind the forwarded port has security vulnerabilities.

In some examples, obtaining port vulnerability data 112 involves accessing a vulnerabilities and exposures database 324. The vulnerabilities and exposures database 324 may be a centralized repository or service that lists known and/or common vulnerabilities and exposures. In general, the applications and services provided by the devices 302 to 312 in the network 300 include services that are implemented using applications available to other devices, including device outside of the network 300. As these applications are used widely, they are evaluated and tested and vulnerabilities and potential security exposures are identified by users, where "users" refers to both human operators and computer administration programs and the like. Common exposures and vulnerabilities relating to specific ports and/or services that are provided may be determined and stored in a database 324 that is made available such that the network edge device 100 is able to access this database 324 and identify common exposures and vulnerabilities. In some cases, the network 300 includes a local version of a vulnerabilities and exposures database 326, which may be maintained and monitored by the network device 100.

Obtaining port vulnerability data 112 by accessing the vulnerabilities and exposures database 324 may involve retrieving entries in the database that relate to the ports and/or services operated by the devices 302 to 312 as determined in the port data 110. In some cases, particular ports may be used by different services and so the vulnerabilities and exposures database 324 may identify port vulnerabilities, service vulnerabilities, and/or vulnerabilities that are based on both a service and specific port. The data retrieved from the vulnerabilities and exposures database 324 is retrieved and stored in the port vulnerability data 112 in association with the specific device and port, and/or service, to which it relates, this is shown in the "CVE" column in FIG. 5.

Obtaining port vulnerability data 112 may additionally, or alternatively, include performing a port security scan to generate port security data representing a strength of security features associated with the port. The network edge device 100 may be configured to perform active scans on the devices 302 to 312 to check the strength of security features being implemented for the port, including, but not limited to, passwords, hashes, and ciphers. A number of techniques for active scans may be used according to the present disclosure. In one example, an Nmap scan technique is used to identify ciphers. Security features such as passwords, hashes, and ciphers may have varying strengths depending on their complexity and/or protocols underlying their use. In some cases, there are predefined standards by which passwords, hashes, and/or ciphers may be compared to determine how effective they are in mitigating risk.

A weak password may include a password that is short, easily guessed, includes minimal variety in characters, includes common words, and so forth. Certain hashing algorithms may be those that have been proven to be high risk, or broken, and hence are not fit for use in security applications. A cipher may be said to be weak if it uses a key that is short, or of insufficient length to provide a desired level of security. While the strength of these security features may vary depending on their implementation, it is to be appreciated that a "weak" security feature typically refers to a security feature that has been configured with insufficient strength to secure the port or provide a desired level of protection from malicious intrusions for the present application.

The port security data representing the strength of the security features associated with the port may include scores, or an indication of the performance of each of the security features compared to respective standards that define desired characteristics of these security features.

Weak security features may increase the risk associated with a given vulnerability and/or exposure. For example, a given service, such as printing on port 80 using a given application, may be associated with a moderate risk of allowing an intrusion into the network. If the device 302 providing this service on port 80 uses strong security features the likelihood of malicious attack getting through may be reduced, whereas if the device 302 implements weak security features the likelihood of a malicious attack directed to this service on port 80 may be more likely to penetrate the network 300.

Obtaining port vulnerability data 112 may additionally, or alternatively, include accessing historical intrusion data 502 identifying historical malicious network penetration attempts. The network 300, and in some cases, the network edge device 100, may implement an Intrusion Detection System (IDS) and/or an Intrusion Prevention System (IPS), that are configured to detect potential malicious attacks and or network 300 intrusion attempts. Historical data on these attacks may include information representing a severity of attack, an application and device that was attacked, the frequency of the attacks, specific identification data such as an IP address and or geographic information associated with the attacker.

As described above, generating 206 the port vulnerability score 114 for a given port is based on the port data 110 and the port vulnerability data 112, which may involve using any one or more of the data from the vulnerabilities and exposures database 324, the historical intrusion data 502, and/or the port security data. In one example, generating the port vulnerability score 114 involves obtaining an initial vulnerability score from the vulnerabilities and exposures database 324, by searching the database 324 based on the specific port and service being provided, and modifying the initial vulnerability score based on one or more characteristics associated with the port.

The characteristics may include an indication of the security practices associated with the port on the device for which the score 114 is being generated and/or the historical intrusion data 502 associated with the port and/or service. For example, an initial vulnerability score, derived from the vulnerabilities and exposures database 324, may represent a moderate risk to the port, and if the device 302 is found to implement weak security features associated with the port, then the initial vulnerability data may be modified such that it represents a greater risk.

Additionally, or alternatively, the historical intrusion data 502 described above may be used to modify the initial vulnerability score such that for example, where there have been significant attacks in the past, or attacks are frequently attempted on the port, the initial score is modified to represent a higher risk. The opposite may also be true, such that where there are strong security features associated with the port and/or the historical intrusion data identifies that not many attacks have occurred in the past on the respective port, the vulnerability score may be modified to represent a lower risk. It is to be appreciated that other methods for generating a port vulnerability score 114 may also be used. For example, in some cases, each of the respective data sources, such as the historical intrusion data 502, security features, and vulnerabilities and exposures data from the database 324, may be of equal or different importance when generating the score 114. A respective score may be generated according to each of these different data sources and combined, for example, based on a weighted average.

The port vulnerability score 114 for a given port and service may be generated repeatedly, for example, at periodic intervals, in response to changes in the network 300, and/or in response to malicious network penetration attempts. By regularly generating and/or updating the port vulnerability score 114 the system may quickly respond to changes in the vulnerabilities in the network 300.

Obtaining 208 the threshold port vulnerability score 116 may involve reading the threshold port vulnerability score 116 from storage 104. An administrator, or user, may set the threshold port vulnerability score 116 during the method 200, or before the method is implemented and this score 116 may be stored in storage 104. In some cases, the threshold port vulnerability score 116 may be a multivariate score including values associated with different respective ports and/or associated with different port vulnerability types. The threshold port vulnerability score 116 may be static or may alternatively be a dynamic value that is modified according to network performance, historic intrusion data 502, and/or other changes in the network 300. For example, if the number of malicious intrusion attempts increases, then the threshold port vulnerability score may be decreased such that the security and risk requirements for allowing access to port forwarding for the device are strict.

Figure 6:
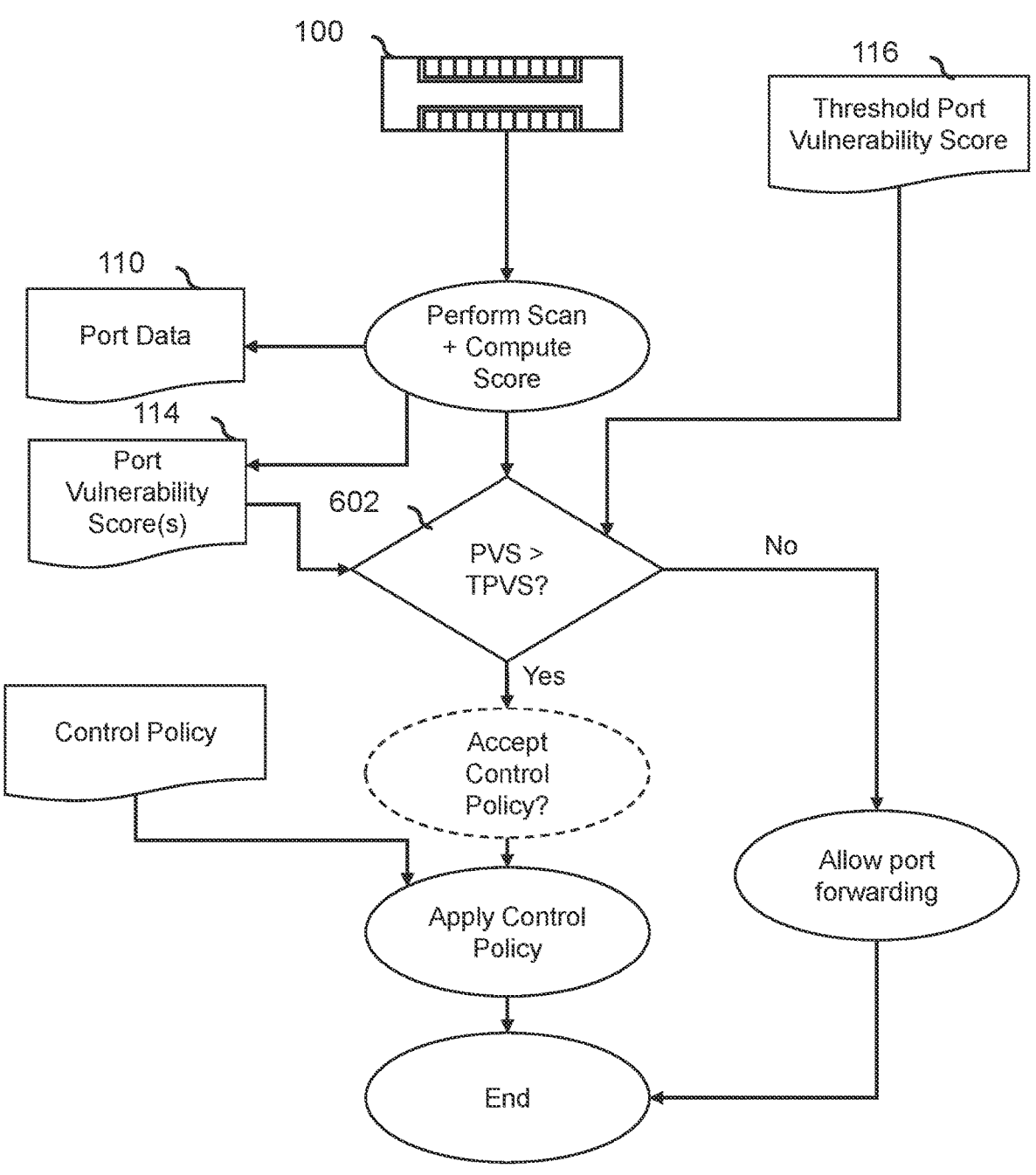
FIG. 6 is a schematic diagram showing an overview of the method according to examples.

Turning to FIG. 6, an example of the method 200 is shown. At block 602 the comparison of the port vulnerability score 114 and the threshold port vulnerability score 116 is shown. According to this process, a single score 114 per port and service may be compared to the threshold port vulnerability score 116. Where a service is associated with multiple ports, a comparison of a respective score 114 for each combination of the port and service may be performed. Alternatively, a port vulnerability score associated with a given service may apply to all ports on which that service is provide and hence a single score 114 may be calculated and compared with the threshold score 116.

In the examples shown, the threshold port vulnerability score 116 and the respective port vulnerability scores 114 are single variate scores. In this case the comparison may be direct comparison of the two scores 114 and 116. It is to be appreciated, however, that the scores 114 and 116 may be multivariate, for example, including a plurality of scores relating to different categories and/or associated with different vulnerability types. In this case, the comparison may be a comparison of corresponding scores 114 and 116 and the outcome of the comparison may include a plurality of comparison results.

If, based on the comparison of the port vulnerability score 114 with the threshold port vulnerability score 116, it is determined that the operation of the service on the given port does not exceed an acceptable vulnerability risk threshold, then the port forwarding for that port and service may be allowed to proceed unrestricted. In the case of single variate scores 114 and 116 this may be determined by a determination of which value is higher. In the case of multivariate scores 114 and 116 all of the values may need to satisfy the same condition for no restriction on the port forwarding to be implemented. It is to be appreciated that, while the example shown determines whether the port vulnerability score 114 is higher than the threshold port vulnerability score 116, the comparison may be inversed, and a larger port vulnerability score may instead represent a lower vulnerability risk.

If it is determined, in the comparison 602, that the port and service are associated with a vulnerability risk level that exceeds the level represented by the threshold port vulnerability score 116, then a policy for controlling access to the port may be implemented which aims to mitigate these risks. In some circumstances, the decision to apply a control policy may be provided to an administrator, who can decide to accept or deny the application of the control policy. Controlling access to the port may involve preventing access to the port when it is determined that the port is vulnerable based on the comparison of the port vulnerability score 114 with the threshold port vulnerability score 116, which in this case is identified when the port vulnerability score 114 exceeds the threshold port vulnerability score 116.

Preventing access to the port in this case may involve rejecting port forwarding requests from external devices 320 and 322 attempting to access the service on the port. In some cases, the service provided on the port may still be available to local devices 302 to 312 in the network, but requests which require the network edge device 100 to perform port forwarding are rejected.

In some cases, controlling access to the port may involve a more precise process that provides granular control over the manner in which the vulnerabilities of the port are mitigated. For example, controlling access to the port may involve implementing a control policy that allows certain devices, more specifically devices having certain characteristics, to access the port, while rejecting others. In some examples, controlling access to the port may involve restricting access to the port based on an IP address of the device requesting the service. The network edge device 100 may, for example, identify one or more IP addresses, or IP address ranges, which are to be rejected from accessing the port. To this end, the network edge device 100 may leverage the historical intrusion data 502 to determine whether there are specific IP addresses which should be allowed, or denied, from accessing the port and may implement a control policy accordingly.

In some cases, the restricting access to the port based on an IP address may comprise determining whether an IP address of an external device 320 attempting to access the service is included in a set or list of approved IP addresses. This may be of particular benefit where a plurality of private networks owned by a single entity, such as a company, are managed separately. A company may implement a separate private network at each of their offices, which may be located in different geographic regions. In this case, the control policy for restricting access to the port when a vulnerability is detected based on the comparison, may involve restricting access to the port for any external devices 320 not associated with the company, but allowing access to devices having an IP address associated with another private network owned by the same company.

Alternatively, restricting access to the port based on an IP address may comprise determining whether the IP address of an external device 320 attempting to access the service is included in a set or list of explicitly banned IP addresses. For example, IP addresses associated with devices that are associated with previous malicious network penetration attempts may be explicitly banned from accessing the port and service offered by the device 302 in the network 300.

Similarly, restricting access to the port may be based on a subnet, or set of subnets, wherein a set of subnets may be listed as approved, and any service request coming from devices outside these subnets may be denied. Alternatively, certain subnets may be disapproved, and rejections of service access requests may be based on a device's 320 inclusion in one of these subnets.

Geographic location of a device attempting to access the service may additionally, or alternatively, be considered when determining whether port forwarding should be restricted. For example, service access requests coming from devices in geographic locations outside of the home country of the private network may be rejected. Service access requests from devices in specific geographic locations may also be rejected. For example, the historic intrusion data 502 may indicate that certain geographic locations are associated with previous intrusion attempts and hence access to the port from the geographic locations may be restricted.

It will be appreciated that a control policy may be based on a combination of these factors and in some cases, different ports and/or services may have different control policies applied to them based on their respective vulnerabilities. Access to a first port may be controlled according to a first control policy and access to a second port may be controlled according to a second control policy, that is different to the first control policy.

In the case of multivariate port vulnerability scores 114 and threshold port vulnerability scores 116, the specific control policy to be applied may be based on a consideration of which, if any, of the port vulnerability scores 114 exceed the corresponding threshold port vulnerability scores 116.

Controlling 210 access to the port may additionally, or alternatively, include generating a warning signal in the network 300 based on an outcome of the comparing the port vulnerability score 114 with the threshold port vulnerability score 116. In this way, an administrator, or user of the associated device 302, can determine whether they should restrict, or shut down, the service provided on the port to avoid the risks associated with operating a vulnerable port.

FIG. 7 shows an example a non-transitory computer-readable storage medium comprising a set of computer-executable instructions 702 to 710. The non-transitory computer-readable storage medium 700 may include a computer program product, disk, or storage device which can be provided to, integrated with, and/or read using a computing device such as a network edge device 100. The computer-executable instructions, 702 to 710, when executed by one or more processor 712 cause the processor(s) 712 to implement a method 200 as described above. The instructions include an instruction 702 to perform an identification scan on the network 300 to generate port data 110 representing the service and the port, an instruction to obtain port vulnerability data 112, an instruction 706 to generate a port vulnerability score 114 for the port based on the port data 110 and the port vulnerability data 112, an instruction 708 to obtain a threshold port vulnerability score 116, and an instruction 710 to control access to the port in dependence on a comparison of the port vulnerability score 114 with the threshold port vulnerability score 116.

It is to be understood that any feature described in relation to any one example may be used alone, or in combination with other features described, and may also be used in combination with one or more features of any other of the examples, or any combination of any other of the examples. Furthermore, equivalents and modifications not described or shown in the accompanying figures above may also be employed without departing from the scope of the invention, which is defined in the accompanying claims. For example, the controlling of access to a port of a device in the network may also be performed in accordance with the claimed embodiments when applied to one-to-many NAT and one-to-one NAT in which the network edge device 100 is capable of controlling access to ports by performing, refusing to perform, or applying granular control to the use of network address translations.

What is claimed is:

1. A computer-implemented method for controlling access to services in a network using a network edge device, the network including at least one device configured to provide a service, the service being associated with a port, the computer-implemented method including:

performing a port identification scan on the network to generate port data representing the service provided by the device and the associated port;

obtaining port vulnerability data;

generating a port vulnerability score for the port based on the port data and the port vulnerability data, wherein the port vulnerability score is dependent on the service provided by the device, and generating the port vulnerability score for the port includes;

obtaining an initial vulnerability score from a vulnerabilities and exposures database; and modifying the initial vulnerability score based on one or more characteristics associated with the port;

obtaining a threshold port vulnerability score; and controlling access to the port in dependence on a comparison of the port vulnerability score with the threshold port vulnerability score, wherein, in response to determining that the port is vulnerable based on the comparison of the port vulnerability score with the threshold port vulnerability score, controlling access to the port comprises rejecting port forwarding requests from external devices that are outside of the network attempting to access the service on the port while maintaining access to the port and associated service for local devices within the network.

2. The computer-implemented method of claim 1, wherein obtaining port vulnerability data includes accessing a vulnerabilities and exposures database.

3. The computer-implemented method of claim 1, wherein obtaining port vulnerability data includes performing a port security scan to generate port security data representing a strength of security features associated with the port, the security features including at least one of:

passwords;

hashes; or ciphers.

4. The computer-implemented method of claim 1, wherein obtaining port vulnerability data includes accessing historical intrusion data identifying historical malicious network penetration attempts.

5. The computer-implemented method of claim 1, wherein controlling access to the port includes restricting access to the port based on at least one of:

Internet Protocol (IP) addresses;

a set of subnets; or a geographic location of a device attempting to access the service.

6. The computer-implemented method of claim 1, wherein controlling access to the port includes generating a warning signal in the network based on an outcome of the comparing the port vulnerability score with the threshold port vulnerability score.

7. The computer-implemented method of claim 1, wherein at least one of the port identification scan and generating the port vulnerability score is performed repeatedly.

8. The computer-implemented method of claim 7, wherein the port identification scan and/or generating the port vulnerability score is performed repeatedly based on at least one of:

a periodic interval;

a change to the network; or a malicious network penetration attempt.

9. A network edge device for controlling access to services provided by a device attached to a network, the network edge device comprising a processor and storage, the storage comprising computer-executable instructions which, when executed by the processor, cause the network edge device to:

perform a port identification scan on the network to generate port data representing the service provided by the device and the associated port;

obtain port vulnerability data;

generate a port vulnerability score for the port based on the port data and the port vulnerability data, wherein the port vulnerability score is dependent on the service provided by the device, and generating the port vulnerability score for the port includes:

obtaining an initial vulnerability score from a vulnerabilities and exposures database; and modifying the initial vulnerability score based on one or more characteristics associated with the port;

obtain a threshold port vulnerability score; and control access to the port in dependence on a comparison of the port vulnerability score with the threshold port vulnerability score, wherein, in response to determining that the port is vulnerable based on the comparison of the port vulnerability score with the threshold port vulnerability score, controlling access to the port comprises rejecting port forwarding requests from external devices that are outside of the network attempting to access the service on the port while maintaining access to the port and associated service for local devices within the network.

10. The network edge device of claim 9, wherein obtaining port vulnerability data includes accessing a vulnerabilities and exposures database.

11. The network edge device of claim 9, wherein obtaining port vulnerability data includes performing a port security scan to generate port security data representing a strength of security features associated with the port, the security features including at least one of:

passwords;

hashes; or ciphers.

12. The network edge device of claim 9, wherein obtaining port vulnerability data includes accessing historical intrusion data identifying historical malicious network penetration attempts.

13. The network edge device of claim 9, wherein controlling access to the port includes restricting access to the port based on at least one of:

an Internet Protocol (IP) addresses;

a set of subnets; or a geographic location of a device attempting to access the service.

14. The network edge device of claim 9, wherein at least one of the port identification scan and generating the port vulnerability score is performed repeatedly.

15. The network edge device of claim 14, wherein the port identification scan and/or generating the port vulnerability score is performed repeatedly based on at least one of:

a periodic interval;

a change to the network; or a malicious network penetration attempt.

16. A non-transitory computer-readable storage medium comprising computer-executable instructions which, when executed by at least one processor, cause the process to:

perform a port identification scan on the network to generate port data representing the service provided by the device and the associated port;

obtain port vulnerability data;

generate a port vulnerability score for the port based on the port data and the port vulnerability data, wherein the port vulnerability score is dependent on the service provided by the device, and generating the port vulnerability score for the port includes:

obtaining an initial vulnerability score from a vulnerabilities and exposures database; and modifying the initial vulnerability score based on one or more characteristics associated with the port;

obtain a threshold port vulnerability score; and control access to the port in dependence on a comparison of the port vulnerability score with the threshold port vulnerability score, wherein, in response to determining that the port is vulnerable based on the comparison of the port vulnerability score with the threshold port vulnerability score, controlling access to the port comprises rejecting port forward requests from external devices that are outside of the network attempting to access the service on the port while maintaining access to the port and associated service for local devices within the network.

* * * * *